(Model.)

J. DOWLING.
LIFTER FOR POTS.

No. 253,269.　　　　　　　　　　Patented Feb. 7, 1882.

Attest:
Herm. Lauten.
E. T. Walker.

Inventor:
James Dowling
By H. S. Abbot
Attorney.

UNITED STATES PATENT OFFICE.

JAMES DOWLING, OF WILKES-BARRÉ, PENNSYLVANIA.

LIFTER FOR POTS.

SPECIFICATION forming part of Letters Patent No. 253,269, dated February 7, 1882.

Application filed July 11, 1881. (Model.)

*To all whom it may concern:*

Be it known that I, JAMES DOWLING, a citizen of the United States of America, residing at Wilkes-Barré, in the county of Luzerne and State of Pennsylvania, have invented certain new and useful Improvements in Lifters for Pots; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
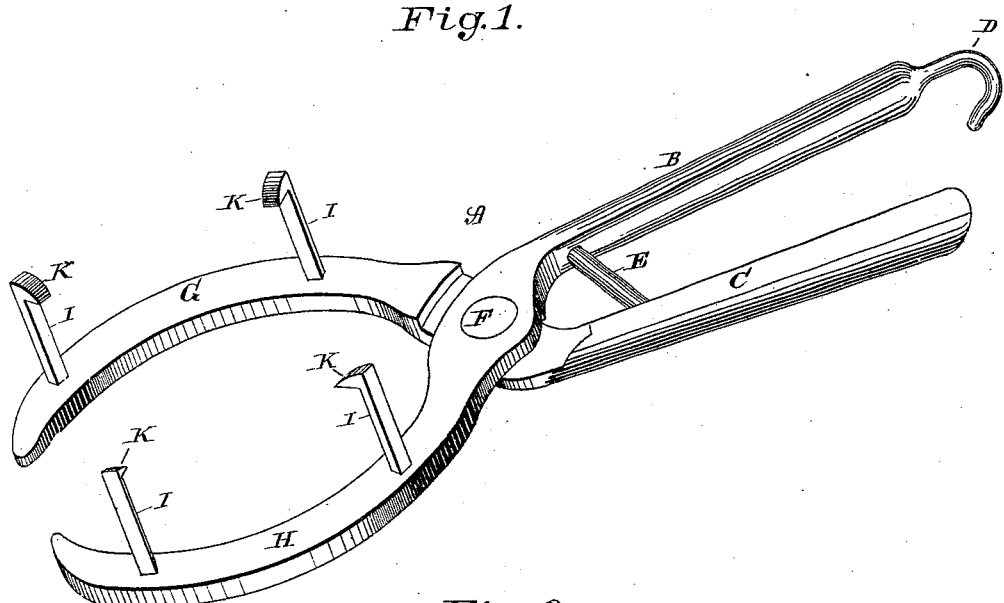
Figure 2:
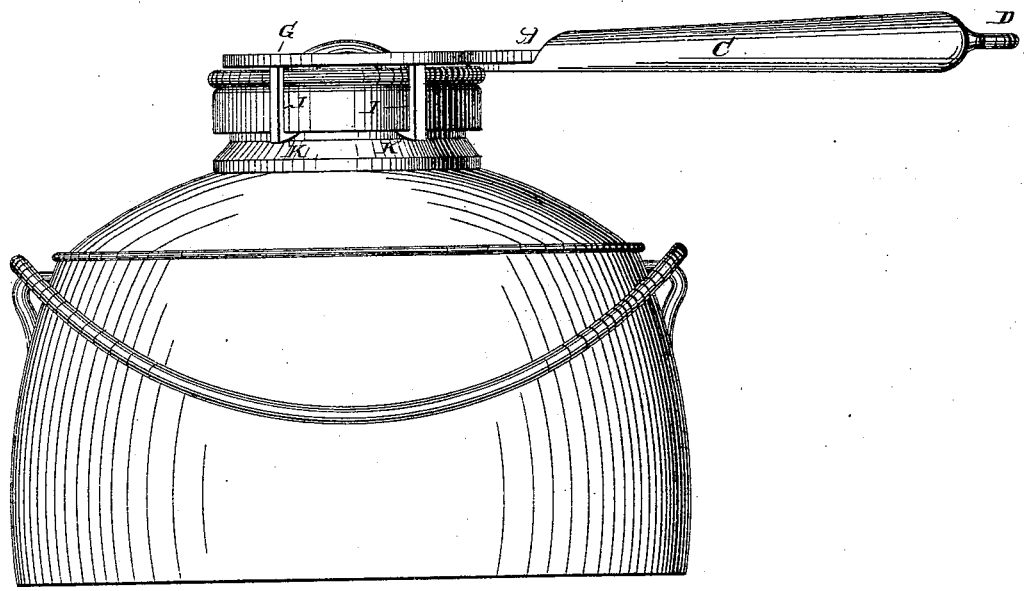

Figure 1 is a perspective bottom view of the lifter. Fig. 2 is a side view of the lifter applied to a bowl or pot set in the top of a kettle.

My invention relates to a lifter for handling certain kinds of forms of cooking utensils; and it consists in the construction and arrangement of parts, as will be hereinafter more particularly described, and then sought to be specifically defined by the claims.

In the accompanying drawings, forming a part of this specification, the letter A represents the tongs or lifter, which is composed of two handles, B and C. The handle B is provided with a hook, D, at the outer end, for convenience in securing a hold on some articles—such as the lids of pots and kettles—and a rod or post, E, on the handle, near the pivot F, to limit the inward movement of the jaws. The handles terminate in two semicircular jaws, G and H, that describe the greater part of a circle from the point where they cross each other, and are pivoted at F. Each of these jaws is provided with two or more projecting hooks, I, for grasping articles. Each of these hooks extends straight downward from the jaw, and their ends terminate in an inward projection or hook, K, of suitable form and size for passing under the projecting flange or shoulder of a pot, kettle, or bowl.

In Fig. 2 I have shown the lifter attached to a peculiar form of bowl or pot of my invention that I have made the subject of an application for Letters Patent.

Having thus described my invention, I claim as new and desire to secure by Letters Patent—

1. The pot-lifter composed of the handles B and C and jaws G and H, provided with hooks I, substantially as set forth.

2. In a pot or bowl lifter composed of jaws G and H, provided with hooks I and handles B and C, a hook, D, connected to one of the handles, substantially as specified.

In testimony whereof I have affixed my signature in presence of two witnesses.

JAMES DOWLING.

Witnesses:
B. F. MYERS,
JOHN FRACE.